United States Patent
Ducloux et al.

(10) Patent No.: US 7,907,666 B2
(45) Date of Patent: Mar. 15, 2011

(54) DEVICE AND METHOD FOR RECODING A VIDEO DATA STREAM

(76) Inventors: Xavier Ducloux, Rennes (FR); Patrice Alexandre, Cesson Sevigne (FR); Patrick Dumenil, Betton (FR)

(*) Notice: Subject to any disclaimer, the term of this patent is extended or adjusted under 35 U.S.C. 154(b) by 1647 days.

(21) Appl. No.: 10/504,105

(22) PCT Filed: Feb. 10, 2003

(86) PCT No.: PCT/FR03/00409
§ 371 (c)(1),
(2), (4) Date: May 23, 2005

(87) PCT Pub. No.: WO03/069915
PCT Pub. Date: Aug. 21, 2003

(65) Prior Publication Data
US 2005/0254791 A1    Nov. 17, 2005

(30) Foreign Application Priority Data
Feb. 11, 2002 (FR) ...................... 02 01744

(51) Int. Cl.
*H04N 7/12* (2006.01)
*H04N 11/02* (2006.01)
*H04N 11/04* (2006.01)
(52) U.S. Cl. .......... 375/240.01; 375/240.03; 375/240.16
(58) Field of Classification Search ............ 375/240.03, 375/240.16, 240.01
See application file for complete search history.

(56) References Cited

U.S. PATENT DOCUMENTS

| 5,805,220 | A  | * | 9/1998  | Keesman et al. | ........ 375/240.01 |
| 6,167,084 | A  | * | 12/2000 | Wang et al.    | .............. 375/240.02 |
| 6,233,278 | B1 |   | 5/2001  | Dieterich      | |
| 6,731,685 | B1 | * | 5/2004  | Liu et al.     | .................. 375/240.14 |
| 2001/0006562 | A1 | | 7/2001 | Tajime | |
| 2003/0002581 | A1 | * | 1/2003 | Moni et al. | ............... 375/240.03 |

FOREIGN PATENT DOCUMENTS

| WO | WO 96/25823 |   | 8/1996 |
| WO | WO9625823   | * | 8/1996 |

OTHER PUBLICATIONS

Search Report Dated Aug. 22, 2003.

* cited by examiner

*Primary Examiner* — Marsha D Banks Harold
*Assistant Examiner* — Jessica Roberts
(74) *Attorney, Agent, or Firm* — Robert D. Shedd; Robert B. Levy

(57) ABSTRACT

Image sequences are advantageously recoded based on an evaluation of complexities before and after trans-coding of the images. Initially, information is extracted representing at least the complexity of recoding each image. A complexity ratio is calculated in accordance with the complexities of images recoded previously using the aforementioned mode to the complexities of the initial coding of said images. After smoothing the complexity ratio undergoes updating. Each image is recoded according to the mode by estimating the complexity of each image to be recoded as the product of the complexity of the initial coding of the image by the smoothed complexity ratio for the mode.

4 Claims, 1 Drawing Sheet

DEVICE AND METHOD FOR RECODING A VIDEO DATA STREAM

This application claims the benefit, under 35 U.S.C. §365 of International Application PCT/FR03/00409, filed Feb. 10, 2003, which was published in accordance with PCT Article 21(2) on Aug. 21, 2003 in French and which claims the benefit of French patent application No. 02/01744, filed Feb. 11, 2002.

BACKGROUND OF THE INVENTION

The development of multimedia applications and the multiplicity of data networks are making data coding systems ever more complex. The interconnection of heterogeneous networks often necessitates the re-encoding, commonly referred to as transcoding, of the data streams that they convey. This re-encoding may be performed in a different compression standard from the initial compression standard (for example, re-encoding according to the MPEG-4 AVC standard (the acronym standing for "Advanced Video Coding") for streams initially coded according to the MPEG-2 or MPEG-4 standard).

Re-encoding is also used chiefly in networks having considerable bit rate constraints. Such re-encoding systems then make it possible to tailor the bit rate of an incoming stream to the requirements and to the limitations of the network.

The regulating of bit rates used in MPEG type video coders or transcoders is undertaken by way of a regulating loop acting on the quantization step size of the DCT coefficients (DCT being the acronym for "Discrete Cosine Transform") of the blocks of the image. The quality and the stability of this regulation depend largely on the quality of prediction of the complexities of the images to be coded for the next group of images.

In a context of source images, numerous double pass coding techniques have been developed, the first coding pass providing precise knowledge of the complexities of the images to be coded, the second pass then coding the images as a function of this complexity.

Such double pass coding techniques are very powerful but expensive in respect of transcoding systems.

BRIEF SUMMARY OF THE INVENTION

The invention therefore proposes a device for re-encoding image sequences based on evaluating the complexities before and after transcoding of the images to be re-encoded.

Accordingly, the invention proposes a device for re-encoding images according to a given preset bit rate of a video stream comprising image sequences initially coded according to at least one mode, comprising:
 means for extracting information associated with the re-encoding of the images, said information representing at least the complexity (Xrecod) of re-encoding of each image,
 means for extracting information, in particular coding complexity information ($X_{init}$), associated with the initial coding of the images,
According to the invention, the device comprises:
 means for calculating a ratio ($Ratio_X$), the so-called complexity ratio, of the complexities ($X_{recod}$) of re-encoding of the images previously re-encoded according to said mode to the complexities ($X_{init}$) of initial coding of these images,
 means for updating an averaged complexity ratio ($SmoothedRatio_X[mode]$) for said mode as a function of the complexity ratio ($Ratio_X$) and
 means for re-encoding each image according to said mode by estimating the complexity ($X_{pred}$) of each image to be re-encoded as being the product of the complexity ($X_{init}$) of initial coding of said image times the averaged complexity ratio for said mode ($SmoothedRatio_X[mode]$).

The inventors have realized that, contrary to an idea well known in the coding context, the complexity of an image is not constant in the image transcoding context:
 in the case of transcoding within one and the same compression standard, the complexity depends on the quantization step size applied to the image and therefore on the coding bit rate of the image sequence.
 in the case of transcoding with change of compression standard, the complexity depends on each compression algorithm's own characteristics, as well as on the previous parameters.

On the other hand, in both cases of transcoding, the ratio of the complexities of initial and re-encoded images is relatively stable.

The extraction of measurements before re-encoding may make it possible to minimize the intelligence required to obtain a sufficient coding quality and the extraction of measurements after re-encoding may make it possible to obtain good operation of the bit rate regulating loop while ensuring good quality of prediction of the complexities of the re-encoded images.

The information arising from coding and from re-encoding make it possible to ascertain the complexities of the images and therefore to define the new re-encoding parameters for the future images to be coded.

In this way, the invention may allow a reduction in cost, possibly appreciable, relative to devices using double pass coders.

According to a preferred embodiment, the device comprises means for storing, for several consecutive images defining a reference period, information associated with the initial coding, said information being
 the complexity of initial coding ($GlobalX_{init}$) of the images of the reference period,
 the incompressible cost ($GlobalOverhead_{init}$) of initial coding of the images of the reference period.

For each current image to be coded, according to this preferred embodiment, the device stores the complexities of a certain number of incoming images to be re-encoded and belonging to a determined reference period and uses the complexity of re-encoding of a certain number of previously re-encoded images to determine the quantization step size to be applied to the current image to be re-encoded.

According to a preferred embodiment, the means for re-encoding each image are dependent on the information associated with the initial coding of the images belonging to the reference period.

Thus, it is possible to obtain temporal stability by basing the re-encoding on the coding and re-encoding information arising from several of the previously re-encoded images.

The invention also relates to a process for re-encoding images according to a given preset bit rate of a video stream comprising image sequences initially coded according to at least one mode, comprising the steps of:
 extracting information associated with the re-encoding of certain images, said information representing at least the complexity (Xrecod) of re-encoding of each image, extracting information, in particular coding complexity information ($X_{init}$), associated with the initial coding of certain images, According to the invention, the process it comprises the steps of:

calculating a ratio ($Ratio_X$), the so-called complexity ratio, of the complexities ($X_{recod}$) of re-encoding of the images previously re-encoded according to said mode to the complexities ($X_{init}$) of initial coding of these images, updating an averaged complexity ratio ($SmoothedRatio_X$ [mode]) for said mode as a function of the complexity ratio ($Ratio_X$) and re-encoding each image according to said mode by estimating the complexity ($X_{pred}$) of each image to be re-encoded as being the product of the complexity ($X_{init}$) of initial coding of said image times the averaged complexity ratio for said mode ($SmoothedRatio_X$ [mode]).

BRIEF DESCRIPTION OF THE DRAWINGS

The invention will be better understood and other features and advantages will become apparent on reading the description of the exemplary embodiments which follow, taken by way of non-limiting examples, with reference to the appended drawings, among which.

DETAILED DESCRIPTION OF THE INVENTION

Figure 1:
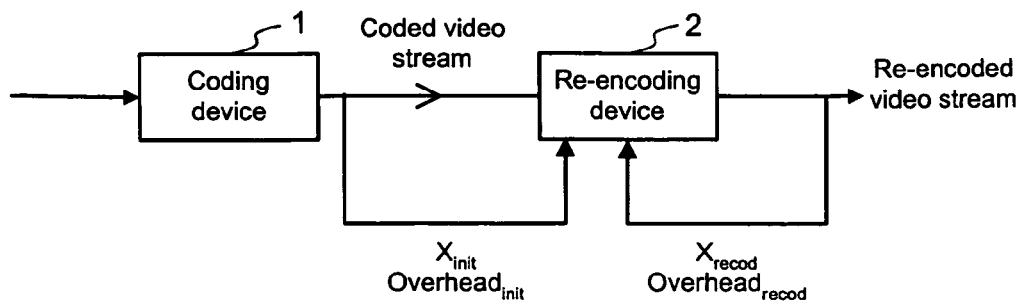
FIG. 1 represents an embodiment of a system including a device according to the invention.

A system representing a device 1 for coding video image sequences as well as a device 2 for re-encoding the same sequences is represented in FIG. 1.

The coding device 1 is a coder of one-pass type.

The coding device 1 transmits a data stream, more particularly an audio/video stream, to the re-encoding device 2. The two devices, coding 1 and re-encoding 2, are in the given exemplary embodiment, interconnected by way of a communication network and therefore far apart, but may be interconnected locally in other embodiments.

The re-encoding device 2 also receives the complexity, $X_{init}$, and the incompressible cost, $Overhead_{init}$, associated with each image of the incoming video stream and representative respectively of the complexity and of the incompressible cost of the initial coding performed by the coding device 1 on the video stream.

The re-encoding device 2 also uses the re-encoding information arising from the re-encoded outgoing streams. This re-encoding information is the complexity of re-encoding, $X_{recod}$, and the incompressible cost of re-encoding, $Overhead_{init}$.

Figure 2:
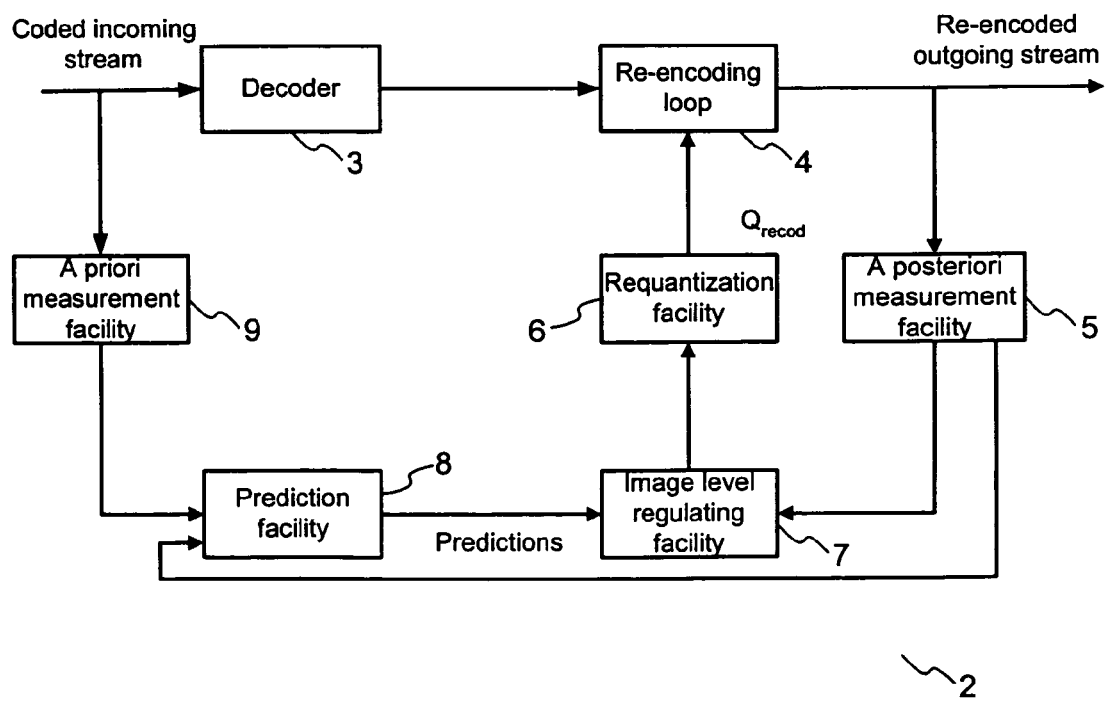
FIG. 2 represents an embodiment of a device according to an embodiment of the invention.

FIG. 2 represents an exemplary block diagram, of a re-encoding device according to the invention.

The device comprises a decoder 3 connected to a re-encoding loop 4 and to an a priori measurement facility 9. The decoder 3 as well as the a priori measurement facility 9 receive as input a binary stream emitted by a coding device 1 as represented in FIG. 1. The binary stream is composed of sequences representative of coded images. The images may be coded according to various modes and for example according to the MPEG-2, MPEG-4 ASP standards (the acronym standing for "Advanced Simple Profile") or the MPEG-4 AVC standard (the acronym standing for "Advanced Video Coding"). In a preferred embodiment detailed hereinbelow, the images may be coded according to three modes, intra, bidirectional or predictive according to the MPEG-2 standard.

The decoder 3 outputs a video stream which enters the re-encoding loop 4.

The re-encoding loop produces a binary stream re-encoded on the basis of the video stream produced by the decoder 3 and of the quantization value $Q_{recod}$ provided by a requantization facility 6.

The re-encoding loop 4 is linked to an a posteriori measurement facility 5. This facility is charged with measuring the complexity $X_{recod}$, and the incompressible cost, $Overhead_{recod}$, of the stream output by the re-encoding loop 4.

The a priori measurement facility 9 receives images organized in sequence or otherwise.

The a priori measurement facility 9 extracts the compressible cost, $Enccost_{init}$, of each image.

The a priori measurement facility 9 extracts the complexity, $X_{init}$, of each image. The complexity is expressed as the product of the compressible cost, $Enccost_{init}$ times the quantization step, $Q_{init}$.

In the embodiment given as an example, the complexity is transmitted in the video stream and a complexity is associated with each image.

In a variant of the embodiment, the complexity of each image is not transmitted with the stream and the a priori measurement facility 9 calculates it as a function of the binary stream.

The a priori measurement facility 9 also extracts the incompressible cost, referred to also as the syntax cost, $Overhead_{init}$, of each image.

In the embodiment given as an example, the incompressible cost is transmitted in the video stream and an incompressible cost, $Overhead_{init}$ is associated with each image.

In a variant embodiment, the incompressible cost of initial coding of each image is not transmitted with the stream and the a priori measurement facility calculates it as a function of the binary stream.

Hence, extraction of the complexity or of the incompressible cost of initial coding is therefore understood to mean the retrieval from the binary stream or the calculation on the basis of the binary stream, of the complexity.

When the module 9 receives a certain number of images forming a reference period, so as to obtain better stability over time, it calculates for each reference period, its complexity, $GlobalX_{init}$, and its incompressible cost, $GlobalOverhead_{init}$. Once all the images have been received, the re-encoding of each image of the sequence begins.

The coding cost consists on the one hand of the compressible cost and on the other hand of the incompressible cost engendered by the syntax and the cost of the vectors.

In the case of MPEG-2 or MPEG-4 ASP coding, the compressible cost is due chiefly to the coefficients of the discrete cosine transformation DCT. In the case of MPEG-4 AVC coding, le compressible cost is due to the whole transformation approximating a DCT transformation.

The a priori measurement facility 9 provides the measurements of initial complexity, $X_{init}$, and of initial incompressible costs, $Overhead_{init}$, of each incoming encoded image to a prediction facility 8.

The a posteriori measurement facility 5 retrieves from the re-encoded output stream, for each image, the incompressible cost $Overhead_{recod}$, the quantization step size $Q_{recod}$.

It calculates the complexity of re-encoding of each image ($X_{recod}$) which is the product of the compressible cost times the quantization step size.

In a preferred embodiment, the coding used is of type DCT, the acronym standing for "discrete cosine transform". In this preferred mode, the compressible cost corresponds to the coefficients of the discrete cosine transformation (DCT) coded according to a variable length code (VLC).

The module 5 outputs the incompressible cost Overhead$_{recod}$ and the quantization step size Q$_{recod}$ to the modules 7 and 8.

The prediction facility 8 calculates for each image, the ratio (Ratio$_{overhead}$) of the initial incompressible cost of the coded image to the incompressible cost of the re-encoded image and the ratio (Ratio$_X$) of the initial complexity of the coded image to the complexity of the re-encoded image.

The ratios thus calculated are stored.

$$Ratio_{overhead} = \frac{Overhead_{recod}}{Overhead_{init}}$$

$$Ratio_X = \frac{X_{recod}}{X_{init}}$$

The module 8 updates, on the basis of the latest ratios thus stored, an averaged complexity ratio, SmoothedRatio$_X$, and an averaged incompressible cost ratio, SmoothedRatio$_{overhead}$. The ratios Ratio$_X$ and Ratio$_{overhead}$ used are evaluated over a period different from the reference period. Specifically, the re-encoding values Overhead$_{recod}$ and X$_{recod}$ are not known upon receipt of the video sequence to be re-encoded since these are the re-encoding values that the re-encoding device is just about to calculate. Thus the ratios used for the calculation of the averaged ratios of incompressible cost and of complexity are based on the values calculated previously and updated in tandem with the re-encoding.

These two factors are calculated for each coding mode. Thus, each image to be re-encoded according to a mode is estimated as a function of the images re-encoded previously according to the same coding mode.

The prediction facility 8 calculates an estimate of the cost of the image to be re-encoded, by calculating an estimate of the complexity of re-encoding, X$_{pred}$, and an estimate of the incompressible cost of re-encoding, Overhead$_{pred}$, for the current image and for the reference period in which it lies.

Overhead$_{pred}$=SmoothedRatio$_{overhead}$[mode]×Overhead$_{init}$

X$_{pred}$=SmoothedRatio$_X$[mode]×X$_{init}$

The module 8 also calculates the incompressible cost (GlobalOverhead$_{pred}$) and the complexity of re-encoding (GlobalX$_{pred}$) of the reference period in which the current image lies.

$$GlobalOverhead_{pred} = \sum_{mode} SmoothedRatio_{overhead}[mode] \times GlobalOverhead_{init}[mode]$$

$$GlobalX_{pred} = \sum_{mode} SmoothedRatio_X[mode] \times GlobalX_{init}[mode]$$

This facility can thus, on the basis of these measurements, provide an estimate of the relative weight of the image to be re-encoded in the image reference period.

The image level regulating facility 7 calculates the image preset compressible cost (Targetcost) as a function of the bit rate preset provided by an external supervising module (not represented), enabling a user to control the re-encoding, and of the predictions of image and global complexity.

$$Targetcost = \frac{X_{pred}}{GlobalX_{pred}} \times GlobalTargetcost \text{ and}$$

$$GlobalTargetcost = \left[\frac{D_{recod}}{frame\_rate} \times Nbimages\right] - GlobalOverhead_{pred}$$

Where:
D$_{recod}$ is the re-encoding preset bit rate, expressed in bit/s.
Nbimages is the number of images in the reference period.
frame_rate is the number of images per second.

In the case of a transcoding in a different compression standard, the image preset bit rate (TargetCost) calculated previously enables the quantization facility 6 to calculate the average quantization step size Q$_{recod}$ to be applied to the image to be re-encoded on the basis of the following formula:

X$_{pred}$=TargetCost×Q$_{recod}$

In the case of a transcoding in one and the same compression standard, the image preset bit rate makes it possible to deduce a compression gain, applicable for the calculation of the re-encoding quantization step size Q$_{recod}$ to be applied to each of the macroblocks of the image to be re-encoded. The image level regulating facility 7 deduces therefrom the compression gain (GainC) to be achieved on the image according to the following formula:

$$GainC = \frac{Enccost_{init}I - Targetcost}{Enccost_{init}}$$

The image level regulating facility 7 transmits the gain, GainC, to the requantization facility 6.

On the basis of the gain, GainC, the requantization facility 6 calculates the quantization step size Q$_{recod}$ to be applied to the image to be re-encoded (globally or for each of the macroblocks) on the basis of the following formulae:

X$_{pred}$=Targetcost×Q$_{recod}$

X$_{init}$=Enccost$_{init}$×Q$_{init}$ $$X_{pred} = X_{init} \times SmoothedRatio_X[mode]$$

$$\text{Hence } Q_{recod} = \frac{SmoothedRatio_X[mode]}{1 - GainC} \times Q_{init}$$

The re-encoding loop therefore uses the new quantization step size Q$_{recod}$ so as to recode the new incoming image entering the re-encoding loop.

1—The example given below describes a particular embodiment in the case of a transcoder of MPEG-2 to MPEG-2 type.

The length of a reference period is the length of a group of images called a GOP, the acronym standing for <<Group Of Pictures)>>.

The various coding modes are the Intra (I), Bidirectional (B) or Predictive (P) mode.

In the case of a coding of MPEG-2 type, the granularity is sometimes finer than a granularity of image type and may lie at the macroblock level. In this case, each macroblock of the image is coded with its own quantization step size.

The a priori measurement facility 9 therefore extracts for each macroblock of the image:
  the initial compressible cost and the initial incompressible cost,
  the quantization step size,
It next calculates for each macroblock the macroblock complexity, as being the product of the compressible cost times the quantization step size.

Next for each image, it calculates:
  the initial compressible cost, Enccost$_{init}$,
  the initial incompressible cost, Overhead$_{init}$,
  the initial image complexity, X$_{init}$,
  by adding respectively the compressible and incompressible costs and the initial complexities of the macroblocks forming this image.

The measurement facility next calculates for each group of images (GOP),
  the aggregate of the initial compressible costs of the I images,
  the aggregate of the initial compressible costs of the B images,
  the aggregate of the initial compressible costs of the P images,
  the aggregate of the initial incompressible costs of the I images, IGOPOverhead$_{init}$,
  the aggregate of the initial incompressible costs of the B images, BGOPoverhead$_{init}$,
  the aggregate of the initial incompressible costs of the P images, PGOPoverhead$_{init}$,
  the aggregate of the initial complexities of the I images, IGOPX$_{init}$,
  the aggregate of the initial complexities of the B images, BGOPX$_{init}$,
  the aggregate of the initial complexities of the P images, PGOPX$_{init}$,
  the initial total cost of the GOP, GOPcost.

The a posteriori measurement facility 5 calculates for each macroblock of the re-encoded image:
  the compressible cost,
  the quantization step size,
  the macroblock complexity, as being the product of the compressible cost times the quantization step size, The module 8 calculates the ratio of the outgoing bit rates, MeanBpp$_{recod}$, of the re-encoding loop 4 to the ratio of the incoming bit rates, MeanBpp$_{init}$, in the re-encoding loop 4.

The outgoing bit rate, MeanBpp$_{recod}$ is calculated on the basis of the preset bit rate provided by the supervising facility.

$$MeanBpp_{recod} = \frac{D_{recod}}{frame\_rate} \times nbimages$$

Where:
D$_{recod}$ is the re-encoding preset bit rate, expressed in bit/s.
Nbimages is the number of images in the reference period.
frame_rate is the number of images per second.

$$MeanBpp_{init} = \frac{GOPcost}{Nbimages\_GOP}$$

Where:
GOPcost represents the total cost (compressible and incompressible) of a GOP.
Nbimages_GOP represents the number of images in the GOP.

The module 8 estimates the complexity and the incompressible cost of each image to be re-encoded and of the current GOP to which the image to be re-encoded belongs.

The prediction facility 8 calculates for each image, as indicated previously in the general embodiment, the ratio (Ratio$_{overhead}$) of the initial incompressible cost of the coded image to the incompressible cost of the re-encoded image and the ratio (Ratio$_X$) of the initial complexity of the coded image to the complexity of the re-encoded image.

To avoid having to take abrupt account of one of the previous ratios that may have lain outside the acceptable limit, and that may for example have arisen from a poor measurement or from an image manifesting a point feature, the ratios are bounded according to the following formula:

RedFactor$_{overhead}$=Ratio$_{overhead}$∈[MINRatio$_{overhead}$,1]

RedFactor$_X$=Ratio$_X$∈[MINRatio$_X$,1]

Where:

MINRatio$_{overhead}$=(1−Weight$_{overhead}$[mode])+Weight$_{overhead}$[mode]×ratiorate MINRatio$_X$=(1−Weight$_X$[mode])+Weight$_X$[mode]×ratiorate Where Weight$_{overhead}$[mode] and Weight$_X$[mode] are constants.

The maximum bound chosen is <<1>> because the re-encoding cannot create an increase complexity.

The complexity and coding cost ratios are dependent on the ratio of the bit rates entering the re-encoding loop and of the bit rates exiting the re-encoding loop and also differ depending on the coding mode.

The module 8 calculates an averaged incompressible cost ratio, and an averaged complexity ratio for each coding mode:
  For the images coded in intra (I) mode SmoothedRatio$_{overhead}$=RedFactor$_{overhead}$ SmoothedRatio$_X$=RedFactor$_X$ For the images coded in Bidirectional (B) or Predictive (P) mode:

$$SmoothedRatio_{Overhead} = \frac{2 \times SmoothedRatio_{Overhead} + RedFactor_{Overhead}}{3}$$

$$SmoothedRatio_X = \frac{2 \times SmoothedRatio_X + RedFactor_X}{3}$$

These two ratios being initialized respectively to the following values:

(1−Weight$_{overhead}$[mode])+Weight$_{overhead}$[mode]×Ratiorate (1−Weight$_X$[mode])+Weight$_X$[mode]×Ratiorate The module 8 next estimates the complexity, X$_{pred}$, and the cost of incompressible re-encoding, Overhead$_{pred}$, of the current image to be re-encoded as indicated in the general exemplary embodiment.

Next; it estimates the complexity, GOPX$_{pred}$, and the incompressible cost, GOPOverhead$_{pred}$, of the current GOP according to the following formulae:

$$GOPOverhead_{pred}=SmoothedRatio_{overhead}[I] \times IGOPOverhead_{init}+SmoothedRatio_{overhead}[B] \times BGOPOverhead_{init}+SmoothedRatio_{overhead}[P] \times PGOPOverhead_{init}$$

$$GOPX_{pred}=ZI \times SmoothedRatio_X[I] \times IGOPX_{init}+ZP \times SmoothedRatio_X[P] \times PGOPX_{init}+ZB \times SmoothedRatio_X[B] \times BGOPX_{init}$$

The weighting constants ZI, ZB, ZP are constants obeying the rule:

$$ZI \times QI = ZP \times QP = ZB \times QP$$

These constants manifest the fact that to get a constant impression of coding quality, the I, B and P images should be quantized differently, the B images being quantized more severely.

The regulating facility 7 calculates the image preset cost as a function of the complexities estimated according to the following formula:

$$Targetcost = \frac{Z[mode]}{GOPX_{pred}} \times X_{pred} \times GOPTargetcost$$

with $$GOPTargetcost=(MeanBPP_{recod} \times Nbimages)-GOPOverhead_{pred}$$

It also calculates the gain, GainC, to be achieved on the image to be re-encoded, as a percentage, in accordance with the formula:

$$GainC = \frac{100 \times (Enccost_{init} - Targetcost)}{Enccost_{init}}$$

This gain is transmitted to the requantization facility 6 which calculates the re-encoding quantization step size, $Q_{recod}$, according to the following formula:

$$Q_{recod} = \frac{SmoothedRatio_X[mode]}{1-GainC} \times Q_{init}$$

2—The example given below describes a particular embodiment in the case of a transcoder of MPEG-2 to MPEG-4 AVC type.

The various coding modes are still the Intra (I), Bidirectional (B) or Predictive (P) mode.

The a priori measurement facility 9 extracts as in the previous example for each macroblock of the image:
the initial compressible cost and the initial incompressible cost,
the quantization step size, It next calculates for each macroblock the macroblock complexity, as being the product of the compressible cost times the quantization step size.

Next for each image, it calculates:
the initial compressible cost, $Enccost_{init}$,
the initial incompressible cost, $Overhead_{init}$,
the initial image complexity, $X_{init}$,
by adding respectively the compressible and incompressible costs and the initial complexities of the macroblocks forming this image.

The measurement facility next calculates for each group of images (GOP),
the aggregate of the initial compressible costs of the I images,
the aggregate of the initial compressible costs of the B images,
the aggregate of the initial compressible costs of the P images,
the aggregate of the initial incompressible costs of the I images, $IGOPOverhead_{init}$.
the aggregate of the initial incompressible costs of the B images, $BGOPoverhead_{init}$.
the aggregate of the initial incompressible costs of the P images, $PGOPoverhead_{init}$.
the aggregate of the initial complexities of the I images, $IGOPX_{init}$,
the aggregate of the initial complexities of the B images, $BGOPX_{init}$,
the aggregate of the initial complexities of the P images, $PGOPX_{init}$,
the initial total cost of the GOP, GOPcost.

The a posteriori measurement facility 5 calculates for each macroblock of the re-encoded image:
the compressible cost,
the quantization step size,
the macroblock complexity, as being the product of the compressible cost times the quantization step size, The module 8 calculates the ratio of the outgoing bit rates, $MeanBpp_{recod}$, of the re-encoding loop 4 to the ratio of the incoming bit rates, $MeanBpp_{init}$, in the re-encoding loop 4.

The outgoing bit rate, $MeanBpp_{recod}$, is calculated on the basis of the preset bit rate provided by the supervising facility.

$$MeanBpp_{recod} = \frac{D_{recod}}{frame\_rate} \times nbimages$$

Where:
$D_{recod}$ is the re-encoding preset bit rate, expressed in bit/s.
Nbimages is the number of images in the reference period.
frame_rate is the number of images per second.

$$MeanBpp_{init} = \frac{GOPcost}{Nbimages\_GOP}$$

Where:
GOPcost represents the total cost (compressible and incompressible) of a GOP.
Nbimages_GOP represents the number of images in the GOP.

The module 8 estimates the complexity and the incompressible cost of each image to be re-encoded and of the current GOP to which the image to be re-encoded belongs.

The prediction facility 8 calculates for each image, as indicated previously in the general embodiment, the ratio ($Ratio_{overhead}$) of the initial incompressible cost of the coded image to the incompressible cost of the re-encoded image and the ratio ($Ratio_X$) of the initial complexity of the coded image to the complexity of the re-encoded image.

To avoid having to take abrupt account of one of the previous ratios that may have lain outside the acceptable limit, and that may for example have arisen from a poor measurement or from an image manifesting a point feature, the ratios are bounded according to the following formula:

$$RedFactor_{overhead}=Ratio_{overhead} \in [MINRatio_{overhead},1]$$

$$RedFactor_X=Ratio_X \in [MINRatio_X,1]$$

Where:

$$MINRatio_{overhead} = (1-Weight_{overhead}[mode]) + Weight_{overhead}[mode] \times ratiorate$$

$$MINRatio_X = (1-Weight_X[mode]) + Weight_X[mode] \times ratiorate$$

Where $Weight_{overhead}[mode]$ and $Weight_X[mode]$ are constants.

The complexity and coding cost ratios are dependent on the ratio of the bit rates entering the re-encoding loop and of the bit rates exiting the re-encoding loop and also differ depending on the coding mode.

The module 8 calculates an averaged incompressible cost ratio, and an averaged complexity ratio for each coding mode:

For the images coded in intra (I) mode $$SmoothedRatio_{overhead} = RedFactor_{overhead}$$

$$SmoothedRatio_X = RedFactor_X$$

For the images coded in Bidirectional (B) or Predictive (P) mode:

$$SmoothedRatio_{overhead} = \frac{2 \times SmoothedRatio_{overhead} + RedFactor_{overhead}}{3}$$

$$SmoothedRatio_X = \frac{2 \times SmoothedRatio_X + RedFactor_X}{3}$$

These two ratios being initialized respectively to the following values:

$$(1-Weight_{overhead}[mode]) + Weight_{overhead}[mode] \times Ratiorate$$

$$(1-Weight_X[mode]) + Weight_X[mode] \times Ratiorate$$

The module 8 next estimates the complexity, $X_{pred}$, and the cost of incompressible re-encoding, $Overhead_{pred}$, of the current image to be re-encoded as indicated in the general exemplary embodiment.

Next, it estimates the complexity, $GOPX_{pred}$, and the incompressible cost, $GOPOverhead_{pred}$, of the current GOP according to the following formulae:

$$GOPOverhead_{pred} = SmoothedRatio_{overhead}[I] \times IGOPOverhead_{init} + SmoothedRatio_{overhead}[B] \times BGOPOverhead_{init} + SmoothedRatio_{overhead}[P] \times PGOPOverhead_{init}$$

$$GOPX_{pred} = ZI \times SmoothedRatio_X[I] \times IGOPX_{init} + ZP \times SmoothedRatio_X[P] \times PGOPX_{init} + ZB \times SmoothedRatio_X[B] \times BGOPX_{init}$$

The weighting constants ZI, ZB, ZP are constants obeying the rule:

$$ZI \times QI = ZP \times QP = ZB \times QP$$

These constants manifest the fact that to get a constant impression of coding quality, the I, B and P images should be quantized differently, the B images being quantized more severely.

The regulating facility 7 calculates the image preset cost as a function of the complexities estimated according to the following formula:

$$Targetcost = \frac{Z[mode]}{GOPX_{pred}} \times X_{pred} \times GOPTargetcost$$

with $$GOPTargetcost = (MeanBPP_{recod} \times Nbimages) - GOPOverhead_{pred}$$

This image preset cost is transmitted to the requantization module 6. As a function of this preset cost, the module 6 will quantize the image to be re-encoded.

The invention claimed is:

1. A device for re-encoding images according to a given preset bit rate of a video stream comprising image sequences initially coded according to at least one mode, comprising:
    means for extracting information associated with the re-encoding of the images, said information representing at least the complexity of re-encoding of each image,
    means for extracting information, in particular coding complexity information associated with the initial coding of the images,
    wherein it comprises:
    means for calculating a complexity ratio of the complexities of re-encoding of the images previously re-encoded according to said mode to the complexities of initial coding of these images,
    means for updating an averaged complexity ratio for said mode as a function of the complexity ratio and
    means for re-encoding each image according to said mode by estimating the complexity of each image to be re-encoded as being the product of the complexity of initial coding of said image times the averaged complexity ratio for said mode;
    means for extracting an overhead value of initial coding of each image,
    means for extracting an overhead value of re-encoding of each re-encoded image,
    means for calculating an overhead ratio of the overhead value of re-encoding of images previously re-encoded according to said mode to the overhead value of initial coding of these images,
    means for updating an averaged overhead ratio for said mode as a function of the overhead ratio and
    means for re-encoding each image according to said mode estimating the overhead value of each image to be re-encoded as being the product of the overhead value-of initial coding of said image times the averaged overhead ratio for said mode.

2. The device as claimed in claim 1, wherein it comprises means for storing, for several consecutive images defining a reference period, information associated with the initial coding, said information being
    the complexity of initial coding of the images of the reference period, the overhead of initial coding of the images of the reference period.

3. The device as claimed in claim 2, wherein the means for re-encoding each image are dependent on the information associated with the initial coding of the images belonging to the reference period.

4. The device as claimed in claim 2, wherein it comprises means for estimating the total overhead associated with re-encoding images of each reference period.

* * * * *